US 11,825,815 B2
United States Patent
Naess et al.

(10) Patent No.: US 11,825,815 B2
(45) Date of Patent: Nov. 28, 2023

(54) BUOYANCY SYSTEM FOR A FISH PEN

(71) Applicant: Akvadesign AS, Brønnøysund (NO)

(72) Inventors: Anders Naess, Brønnøysund (NO); Trond Otto Johnsen, Brønnøysund (NO)

(73) Assignee: Akvadesign AS, Brønnøysund (NO)

( * ) Notice: Subject to any disclaimer, the term of this patent is extended or adjusted under 35 U.S.C. 154(b) by 275 days.

(21) Appl. No.: 17/060,616

(22) Filed: Oct. 1, 2020

(65) Prior Publication Data

US 2021/0029975 A1 Feb. 4, 2021

Related U.S. Application Data

(63) Continuation of application No. 16/080,145, filed as application No. PCT/NO2017/050056 on Mar. 1, 2017, now Pat. No. 10,827,729.

(30) Foreign Application Priority Data

Mar. 2, 2016 (NO) .................................. 20160358

(51) Int. Cl.
*A01K 61/00* (2017.01)
*A01K 61/65* (2017.01)
*A01K 61/60* (2017.01)

(52) U.S. Cl.
CPC .............. *A01K 61/65* (2017.01); *A01K 61/60* (2017.01); *Y02A 40/81* (2018.01)

(58) Field of Classification Search
CPC ........ A01K 61/60; A01K 61/00; A01K 61/75; A01K 71/00; A01K 61/65
See application file for complete search history.

(56) References Cited

U.S. PATENT DOCUMENTS

| 4,092,797 | A | 6/1978 | Azurin |
| 4,798,168 | A | 1/1989 | Vadseth et al. |
| 5,172,649 | A | 12/1992 | Bourgeois |
| 5,655,938 | A * | 8/1997 | Huguenin ............. A01K 61/60 |
| | | | 441/29 |
| 5,967,086 | A | 10/1999 | Knott, Sr. |
| 6,216,635 | B1 | 4/2001 | McRobert |

(Continued)

FOREIGN PATENT DOCUMENTS

| AU | 2014201866 | 3/2015 |
| AU | 2019226202 | 9/2019 |

(Continued)

OTHER PUBLICATIONS

Norwegian Search Report, Norwegian Patent Application No. 20160358, dated Sep. 6, 2016.

(Continued)

*Primary Examiner* — Kristen C Hayes
(74) *Attorney, Agent, or Firm* — ANDRUS INTELLECTUAL PROPERTY LAW, LLP

(57) ABSTRACT

A buoyancy system is for a fish pen. The fish pen has an enclosure for keeping fish confined in the fish pen, the enclosure being secured to an inner flexible buoyancy body floating on a water surface. The buoyancy system has an outer buoyancy body on the outside of the inner buoyancy body. The inner buoyancy body is attached to the outer buoyancy body with a mooring so that the outer buoyancy body and the inner buoyancy body move independently of each other relative to waves.

18 Claims, 6 Drawing Sheets

(56) References Cited

U.S. PATENT DOCUMENTS

| | | | |
|---|---|---|---|
| 10,231,443 | B2 | 3/2019 | Grace et al. |
| 2008/0029040 | A1 | 2/2008 | Cortinas et al. |
| 2010/0050952 | A1* | 3/2010 | Stillman .......... A01K 61/60 119/223 |
| 2010/0058991 | A1 | 3/2010 | Dobson et al. |
| 2014/0243155 | A1 | 8/2014 | Publicover et al. |

FOREIGN PATENT DOCUMENTS

| | | |
|---|---|---|
| CN | 202819304 | 3/2013 |
| CN | 104170779 | 12/2014 |
| CN | 104642225 | 5/2015 |
| FR | 2598884 | 11/1987 |
| FR | 2657750 | 8/1991 |
| JP | 04104747 | 4/1992 |
| JP | 4214029 | 4/2005 |
| JP | 2005160316 | 6/2005 |
| JP | 2014082997 | 5/2014 |
| NO | 160752 | 8/1985 |
| NO | 166511 | 6/1988 |
| NO | 165783 | 1/1991 |
| NO | 335337 | 11/2014 |
| NO | 20141089 | 3/2016 |
| RU | 2105471 | 2/1998 |
| RU | 2330406 | 8/2008 |
| UA | 61903 | 8/2011 |
| WO | 9402005 | 7/1992 |
| WO | 9306720 | 4/1993 |
| WO | 9624245 | 8/1996 |
| WO | 9832330 | 7/1998 |
| WO | 2006063412 | 6/2006 |
| WO | 2010016769 | 8/2008 |
| WO | 2010099590 | 3/2009 |
| WO | 2012154054 | 11/2012 |
| WO | 2014123427 | 2/2013 |
| WO | 2013085392 | 6/2013 |
| WO | 2013105078 | 7/2013 |
| WO | 2011133045 | 4/2014 |

OTHER PUBLICATIONS

International Search Report, PCT/NO2017/050070, dated Apr. 5, 2017.
Written Opinion, PCT/NO2017/050056, dated Apr. 5, 2017.
Extended European Search Report issued in European Patent Application No. 23179511.3 dated Sep. 27, 2023.

* cited by examiner

BUOYANCY SYSTEM FOR A FISH PEN

CROSS-REFERENCE TO RELATED APPLICATIONS

This application is a continuation of U.S. application Ser. No. 16/080,145, filed Aug. 27, 2018, which '145 application is the U.S. national stage application of International Application PCT/NO2017/050056, filed Mar. 1, 2017, which international application was published on Sep. 8, 2017, as International Publication WO 2017/150986 in the English language. The International Application claims priority of Norwegian Patent Application No. 20160358, filed Mar. 2, 2016. All of the above applications are incorporated herein by reference, in entirety.

FIELD

This invention relates to a buoyancy system for a pen which is used for farming fish. More particularly, the invention relates to a first buoyancy unit which is movably attached to a second buoyancy unit. The first buoyancy unit comprises an inner, annular, flexible buoyancy body and the enclosure of the fish pen in the form of a net or a cloth is releasably se-cured to the inner buoyancy body. The second buoyancy unit comprises one or more rigid outer buoyancy bodies which may constitute a work platform, on the outside of the first buoyancy unit. The first buoyancy unit and the second buoyancy unit move independently of each other relative to waves.

BACKGROUND

The farming of fish for food may take place in tanks, vessels or ponds on land and in enclosures floating on a water surface. Such a floating enclosure may be positioned in a lake or in sea water and is termed a fish pen. The farming of marine species takes place in fish pens. The farming of anadromous fish, like salmon (Salmo salar) and rainbow trout (Oncorhynchus mykiss) also takes place in fish pens after the fish has adapted to sea water and been placed in sea water.

Fish pens can be divided into two main groups: open fish pens and closed fish pens. An open fish pen comprises a net forming the physical enclosure for the fish and an encircling buoyancy unit keeping the net afloat. In addition, necessary moorings and anchor systems to keep the fish pen in place, and an encircling jump net to prevent the fish from escaping by jumping over the buoyancy unit. The water flows freely through the net. A closed fish pen comprises a tight wall so that water cannot flow freely into the enclosure. The tight wall may be a wall of a rigid material or of a soft material in cloth form.

An open fish pen has some drawbacks. For farming of salmonoids it is a drawback that fish become infected with crustacean parasites, such as salmon lice, and by other diseases owing to viruses, bacteria and parasites. The fish escape, especially when tears are accidentally formed in the net. An open fish pen releases waste products like faeces and uneaten feed into a recipient. The water temperature inside the fish pen follows the temperature of the surrounding water. In winter, the water temperature may be too low, especially close to the surface, for the fish to grow optimally. In summer, the water temperature may be too high for the fish to grow optimally.

A closed fish pen is an alternative to an open fish pen, and a closed fish pen solves some of the problems connected to an open fish pen. Closed farming pens are known in the trade. The patent documents NO160752, U.S. Pat. No. 4,798,168, WO 2011/133045 and WO 2014/123427 disclose examples of such fish pens in which the walls are formed of a tight cloth material.

Closed fish pens in which the walls are formed of a rigid material are known as well. Patent document NO 166511 discloses a semi-submersible floating platform comprising cylindrical silos provided with a cone-shaped lower portion. Patent document 165783 discloses a hull-shaped container for fish. Patent document WO2010/016769 discloses a fish pen of a watertight and substantially rigid material, the fish pen being substantially hemispherical. Patent document WO2010/099590 discloses a fish pen made up of watertight fibre-glass panels with intermediate foam material to give buoyancy. The fish pen is substantially cylindrical with a flat bottom. Patent document WO 94/02005 discloses a closed fish pen with a cylindrical upper part and a conical lower part. The fish pen may consist of steel, concrete or a soft, reinforced plastic cloth.

The buoyancy system for a floating fish pen may consist of rectangular walkways in steel provided with floating bodies. The walkways are connected to each other with hinges. The walkways form a grid with longitudinal and transverse walkways. Such a buoyancy system is usually used together with open fish pens. The seine, forming the enclosure for fish, is placed in a square and secured to the surrounding walkways on hooks each projecting from a post or a support. The buoyancy system may also consist of at least one plastic pipe which is welded together to form a ring. The buoyancy system usually comprises two concentric rings side by side. Plastic pens having three concentric plastic rings are also known. The plastic rings are connected with radially oriented rigid clamps in plastic or metal. The clamps hold the plastic rings spaced apart by a fixed distance. The plastic rings will move identically in waves. Walkways may be placed on top of two concentric rings. In an open fish pen, the seine is placed inside the innermost ring of the buoyancy system and secured with projecting seine hooks. The seine hooks may be secured to the pipe or to a railing projecting up from the buoyancy system. The circumference of the seine in a plastic pen may be, for example, between 90 m and 160 m, corresponding to a diameter of approximately between 30 m and 50 m.

Known, closed fish pens solve some of the drawbacks associated with an open fish pen. The known, closed fish pens also have some problems.

To ensure that the water-exchange rate is sufficient for maintaining a good aquatic environment inside the fish pen, it is common to pump in so much water that the water surface within the fish pen is higher than the water surface outside the fish pen. Thereby the pressure inside the fish pen is larger than the surrounding pressure, and water will flow out of the fish pen through formed openings. This subjects the buoyancy system of a closed fish pen to greater forces than those in the buoyancy system of an open fish pen of the same size. In addition to keeping the cloth or net itself of the fish pen afloat, the buoyancy of the buoyancy system must be dimensioned for holding the amount of water inside the fish pen that is above the water surface of the surrounding water. This water constitutes a considerable mass. In addition, this water has a moment of inertia which causes the wave influence on the buoyancy system to be larger than in an open fish pen in which the wave motion passes substantially unobstructedly by the buoyancy system into the fish pen. The walls of closed fish pens may, as mentioned, comprise a material in cloth form. Owing to the fact that the amount of water inside the fish pen provides a negative buoyancy, the material in cloth form must have a great tear strength. A material in cloth form cannot be attached to the buoyancy system in the same way as a seine. Perforation of the material in cloth form weakens the tear strength. The perforation must take place above the water surface. The hole may be reinforced with a grommet, but it is difficult to adapt the spacing of a plurality of holes in a cloth to a plurality of hooks on the buoyancy system or on the railing in such a way that the cloth will be kept smooth. The water pressure inside the fish pen will stretch the cloth, whereas too short distances between the hooks will create folds. Too long a distance between the hooks in relation to the holes formed makes it impossible to use one or more of the hooks. In a closed fish pen, this weakens the strength of the attachment of the cloth of the fish pen to the buoyancy system.

In closed fish pens with rigid walls, the buoyancy system may be integrated in the walls, as shown in the patent document WO2010/099590, for example, or be flexible elements attached to the walls as shown in the patent document WO2010/016769.

In closed fish pens with walls of a cloth-form material, there are several known ways of forming the buoyancy system. WO 2013/085392 discloses a buoyancy system comprising a plurality of like modules extending around the fish pen. Each module is provided with at least one slot in a side facing the fish pen. A strap which is attached to the pen wall may be secured in the slot. The strap may be attached to the cloth material of the fish-pen wall without holes being formed in the cloth material, as is described in patent document WO 2014/123427. Patent document WO 2014/123427 also shows an alternative buoyancy system. Two concentric plastic rings of approximately the same radius are positioned around the fish pen, one plastic ring lying above the other.

Patent document WO 2011/133045 shows a buoyancy system formed as a rigid collar surrounding the circumference of the fish pen. The collar is provided with brackets distributed around the fish pen. The tight bag is suspended from the brackets.

A relatively large and rigid buoyancy system as described in WO 2011/133045 will partially work as a breakwater or a wave-damper for the closed bag within the buoyancy system. As mentioned above, the closed bag contains a considerable water volume and the bag will move differently from the buoyancy system in waves. This involves a considerable strain on the securing device between the closed bag and the buoyancy system. A buoyancy system as disclosed in patent documents WO 2013/085392 and WO 2014/123427 follow the wave motion together with the bag and the strain on the securing device between the closed bag and the buoyancy system will be small. However, this has the drawback of there being no breakwater or wave-damper around the fish pen, which gives increased strain on the bag wall itself. In winter, there may also be the risk of ice floating in the water surface and such ice may be driven under a shallow buoyancy system, tearing holes in the bag.

There is a need to devise an alternative securing device for a tight bag for a buoyancy system, such that the strain is distributed across a larger portion of the bag than with the prior art. According to the prior art, the securing device is attached to the bag in the upper portion of the bag and usually above the water surface. There is also a need for a securing device which quickly can be attached to the bag and quickly can be secured to the buoyancy system and which can quickly be released again.

SUMMARY

The invention has for its object to remedy or reduce at least one of the drawbacks of the prior art or at least provide a useful alternative to the prior art.

The object is achieved through the features which are specified in the description below and in the claims that follow.

In a first aspect, the invention relates, more specifically, to a buoyancy system for a fish pen, the fish pen comprising an enclosure for keeping fish confined in the fish pen, the enclosure being secured to an inner flexible buoyancy body floating on a water surface. The buoyancy system comprises an outer buoyancy body on the outside of the inner buoyancy body, and the first buoyancy body is secured to the second buoyancy body with a mooring so that the outer buoyancy body and the inner buoyancy body move independently of each other relative to waves. The mooring may be elastic.

The enclosure may be selected from a group comprising a seine and a watertight cloth.

The inner floating body may be annular. The inner floating body may consist of a pipe.

The outer floating body may consist of one rigid floating element encircling the entire inner floating element. The one outer floating body may be provided with a side facing the inner floating body, wherein the side may be concavely curved to form an inside circular shape. In an alternative embodiment, the outer floating body may comprise a module arranged to be connected to an adjacent module so that a plurality of modules encircles the entire inner floating body. The module may be provided with a side facing the inner floating body, wherein the side may be concavely curved to form a portion of an inside circular shape.

The mooring may be selected from a group comprising a rope, a wire, a round sling and a chain. The mooring may be provided with a mooring spring.

A coupling for releasably securing an enclosure of a fish pen for fish-farming to a buoyancy body for the fish pen is described as well, the enclosure having a wall with an outside and an inside, and the enclosure being secured to the buoyancy body that is floating on a water surface. A fastening eye may be attached to the outside of the wall in a portion below the buoyancy body, and a strap connects the fastening eye to the buoyancy body. The fastening eyes may be distributed around the circumference of the enclosure.

The coupling may include a coupling arm which may be secured, in its lower end portion, to the outside of the wall and which may be provided with the fastening eye in its free end portion.

The fastening eye of the coupling may consist of a sleeve substantially horizontal in a position of application, wherein the sleeve may have a first opening and a second opening; an elongated yoke with a first end portion and a second end portion may be positioned in the sleeve in such a way that the first end portion projects beyond the first opening and the second end portion projects beyond the second opening; and a strap may connect the first end portion to the buoyancy body and a strap may connect the second end portion to the buoyancy body.

The yoke may be provided with a through opening in at least one of the first and second end portions, and the through opening may house a strap. The strap may be selected from a group comprising a rope, a round sling, a wire and a chain. The fastening eye may be releasably secured to the buoyancy body with at least two straps.

In one embodiment, the sleeve may consist of a portion of a seine, and the sleeve may be attached to an enclosure consisting of a seine. In an alternative embodiment, the coupling arm may consist of a polymer material in cloth form, the wall may consist of a polymer material in cloth form and the lower end portion of the coupling arm may be fixed to the wall with a weld.

A coupling for releasably securing an enclosure in a fish pen for fish-farming to a buoyancy body for the fish pen is described as well, the enclosure having a wall with an outside and an inside, the enclosure being secured to the buoyancy body floating on a water surface, and the buoyancy body having an inside, an outside and a top side. A fastening eye may be attached to the outside of the wall in a portion below the buoyancy body; a strap may connect the fastening eye to the buoyancy body; the strap may be provided with a first portion and a second portion, and the strap may be provided with a hook in at least one of the first portion and the second portion. The fastening eyes may be distributed around the circumference of the enclosure.

The first portion of the strap and the second portion of the strap may each be provided with a hook, and a further portion of the strap is housed in the fastening eye so that the first portion of the strap extends past the inside of the buoyancy body to the top side of the buoyancy body, so that the second portion of the strap extends past the outside of the buoyancy body to the top side of the buoyancy body and so that the two hooks may be connected to each other at the top side of the buoyancy body.

The fastening eye may consist of a sleeve substantially horizontal in a position of application, the sleeve having a first opening and a second opening; an elongated yoke with a first end portion and a second end portion may be positioned in the sleeve in such a way that the first end portion may project beyond the first opening and the second end portion may project beyond the second opening; and a strap may connect the first end portion to the buoyancy body and a strap may connect the second end portion to the buoyancy body. The yoke may be provided with a through opening in at least one of the first and second end portions, and the through opening may house a strap.

In one embodiment, the first portion of the strap and the second portion of the strap may each be provided with a hook, and a further portion of the strap may be housed in the through opening so that the first portion of the strap may extend past the inside of the buoyancy body to the top side of the buoyancy body, so that the second portion of the strap may extend past the outside of the buoyancy body to the top side of the buoyancy body and so that the two hooks may be connected to each other at the top side of the buoyancy body.

In an alternative embodiment, the coupling may include two straps, wherein each strap may be secured, in the first portion, to one of the end portions of the yoke, each strap may be provided, in the second portion, with a hook, and so that one strap may extend past the inside of the buoyancy body to the top side of the buoyancy body, and the second strap may extend past the outside of the buoyancy body to the top side of the buoyancy body, and so that the two hooks may be connected to each other at the top side of the buoyancy body.

The strap may be selected from a group comprising a round sling, a rope, a wire and a chain. The hook may be a C-hook.

A use of a round sling in a coupling for securing an enclosure in a pen as described in the foregoing is described as well, wherein the round sling is formed as a strap with a first portion and a second portion, and wherein a hook is attached to at least one portion.

BRIEF DESCRIPTION OF THE DRAWINGS

In what follows, examples of preferred embodiments are described, which are visualized in the accompanying drawings, in which.

DETAILED DESCRIPTION

Figure 1:
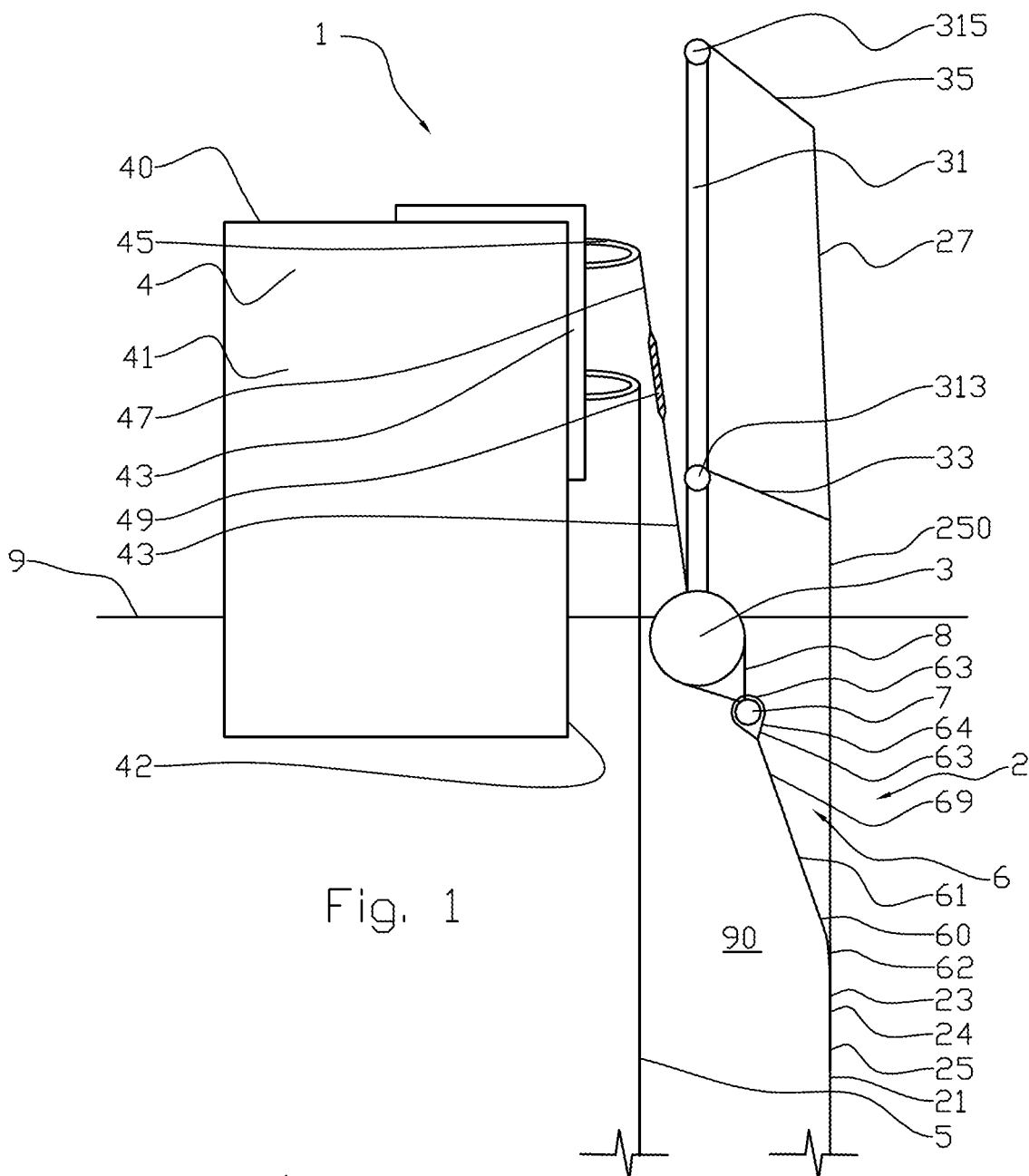
FIG. 1 shows schematically a section of a buoyancy system and an upper portion of a closed farming pen.

In the figures, the reference numeral 1 indicates a buoyancy system for a fish pen 2. The buoyancy system 1 comprises an inner buoyancy body 3 which is directly connected to the fish pen 2 and an outer buoyancy body 4 which is directly connected to the inner buoyancy body 3. The inner buoyancy body 3 extends around the circumference of the fish pen 2. The outer buoyancy body 4, too, extends around the circumference of the fish pen 2, on the outside of the inner buoyancy body 3. Both the inner buoyancy body 3 and the outer buoyancy body 4 are floating on a water surface 9.

The fish pen 2 includes an enclosure 21. The enclosure 21 may comprise a tight cloth 23 or a seine 24. The enclosure 21 is formed with a wall 25 and a bottom (not shown) so that fish (not shown) in the enclosure 21 cannot escape. The upper portion 250 of the wall 25 extends above a water surface 9. The fish pen 2 is provided with a jump net 27 above the wall 25. A railing 31 is secured to the first buoyancy body 3 and the railing 31 extends around the circumference of the fish pen 2. The railing 31 includes a plurality of posts 311, a lower handrail 313 and an upper handrail 315. The upper portion 250 of the wall 25 is attached to the railing 31 with a releasable lower fastening band 33. The jump net 27 is attached to the railing 31 with a releasable upper fastening band 35.

The inner buoyancy body 3 is shown as a closed pipe. A pipe like that may consist of a polymer material such as polyethylene. Such a pipe is known in the art and will not be described any further. The inner buoyancy body 3 is flexible and will follow wave movements. The enclosure 21 is releasably secured to the inner buoyancy body 3.

The outer buoyancy body 4 may consist of a rigid material such as concrete or a metal. The outer buoyancy body 4 may be formed as a rigid ring, or the outer buoyancy body 4 may consist of a plurality of modules 41 forming an articulated connection around the inner buoyancy body 3. The outer buoyancy body 4 is provided with a concavely curved side 42 facing the inner buoyancy body 3 so that the buoyancy body 4 forms a circular inside shape. The module 41 is provided with a concavely curved side 42 facing the inner buoyancy body 3 so that the buoyancy body 4 forms a portion of a circular inside shape. The outer buoyancy body 4 has a greater buoyancy than the inner buoyancy body 3. The outer buoyancy body 4 may be provided, on its top side 40, with a surface 40 for personnel (not shown) to be able to move around the fish pen 2. The surface 40 may also be a storage area for equipment (not shown), a base for a crane (not shown) and storage area for feed (not shown). The outer buoyancy body 4 is provided, on its side facing the inner buoyancy body 3, with an attachment 43 for releasably attaching the inner buoyancy body 3 to the outer buoyancy body 4. The attachment 43 is shown with a plurality of attachment hoops 45.

Figure 2:
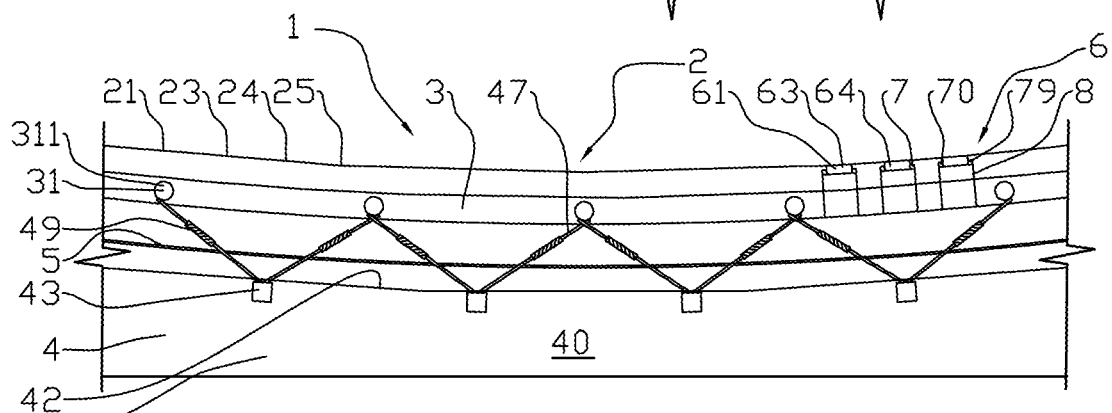
FIG. 2 shows a schematic top view, on a smaller scale, of the buoyancy system and the closed fish pen shown in FIG. 1.

A mooring 47 extends from the attachment 43 to the inner buoyancy body 3. The mooring 47 may be of a type known per se, such as a rope, a line, a strap, a round sling, a wire or a chain, and may be provided with a strain-relief element or mooring spring 49. The mooring 47 may be releasably secured to the attachment hoop 45 and lashed around the inner buoyancy body 3 and the railing 31 in a manner known per se, see FIG. 2. It is thereby achieved that the inner buoyancy body 3 can move independently of the outer buoyancy body 4.

A catching net 5 may be attached to the attachment 43 in such a way that it extends downwards in a water column 90 between the outer buoyancy element 4 and the inner buoyancy element 3 and further downwards in the water column 90. The catching net 5 will catch fish escaping from the enclosure 21 if a tear should arise in the cloth 23 or seine 24.

A buoyancy system 1 like the one shown has the advantage of the outer buoyancy body 4 having large enough dimensions to function as a breakwater or wave damper for the fish pen 2. The buoyancy body 4 may also be deep-draught enough to prevent drift ice from getting to the fish pen 2. The buoyancy body 4 also functions as a work place. The inner buoyancy body 3 is flexible enough to follow the wave movements and to follow the movements of the fish pen 2. Under normal operating conditions, the inner buoyancy body 3 has sufficient buoyancy to keep the fish pen 2 afloat whether the fish pen 2 is of the open type or of the closed type. For closed fish pens 2 in particular, it may happen that a portion of the inner buoyancy body 3 becomes completely submerged below the water surface 9. The outer buoyancy body 4 will then, by way of the mooring 47, prevent the inner buoyancy body 3 from sinking so deep that the water surface gets above the upper portion 250 of the wall 25. Thus, the outer buoyancy body 4 constitutes a backup buoyancy for the inner buoyancy body 3.

The enclosure 21 is secured to the inner buoyancy body 3 with a coupling 6. The coupling 6 comprises a coupling arm 61 which is fixed in its lower end portion 60 to the wall 25 on the outside of the wall 25. If the wall 25 comprises a seine 24, the coupling arm 61 may be fixed with a lashing or a seam (not shown). If the wall 25 comprises a tight cloth 23, the coupling arm 61 may consist of a polymer material in cloth form or a reinforced polymer material in cloth form, and the lower portion of the coupling arm 61 is fixed to the cloth 23 with a weld 62 (see FIGS. 3, 4, 8). The weld 62 covers a sufficient surface of the cloth 23 so that the cloth 23 will not tear at the weld 62. A plurality of coupling arms 61 is distributed around the circumference of the enclosure 21.

In its free end portion 69, the coupling arm 61 is provided with a fastening eye 63. In a first embodiment, the fastening eye 63 may be formed as a channel or sleeve 64 with a first opening and a second opening. In the position of application, the longitudinal direction of the sleeve 64 will be approximately horizontal. The sleeve 64 may be formed by welding the cloth-form material of the coupling arm 61 to itself or possibly by fixing the cloth-form material to itself with a seam. In an alternative embodiment, the fastening eye 63 may be formed as a lift eye 65, see FIG. 4. The fastening eye 63 is positioned in a submerged portion below the buoyancy body 3.

In the first embodiment, the coupling 6 comprises an elongated yoke 7 with a first end portion 70 and a second end portion 79. The yoke 7 is positioned in the sleeve 64 in such a way that the first end portion 70 of the yoke 7 projects from the first opening of the sleeve 64 and the second end portion 79 projects from the opposite second opening of the sleeve 64. In its first end portion 70, the yoke 7 is provided with a first through opening 71 perpendicular to the longitudinal direction of the yoke 7. In its second end portion 79, the yoke 7 is provided with a second through opening 73 perpendicular to the longitudinal direction of the yoke 7 (see FIGS. 3 and 5). The yoke 7 may be a solid rod or a pipe.

Figure 5:
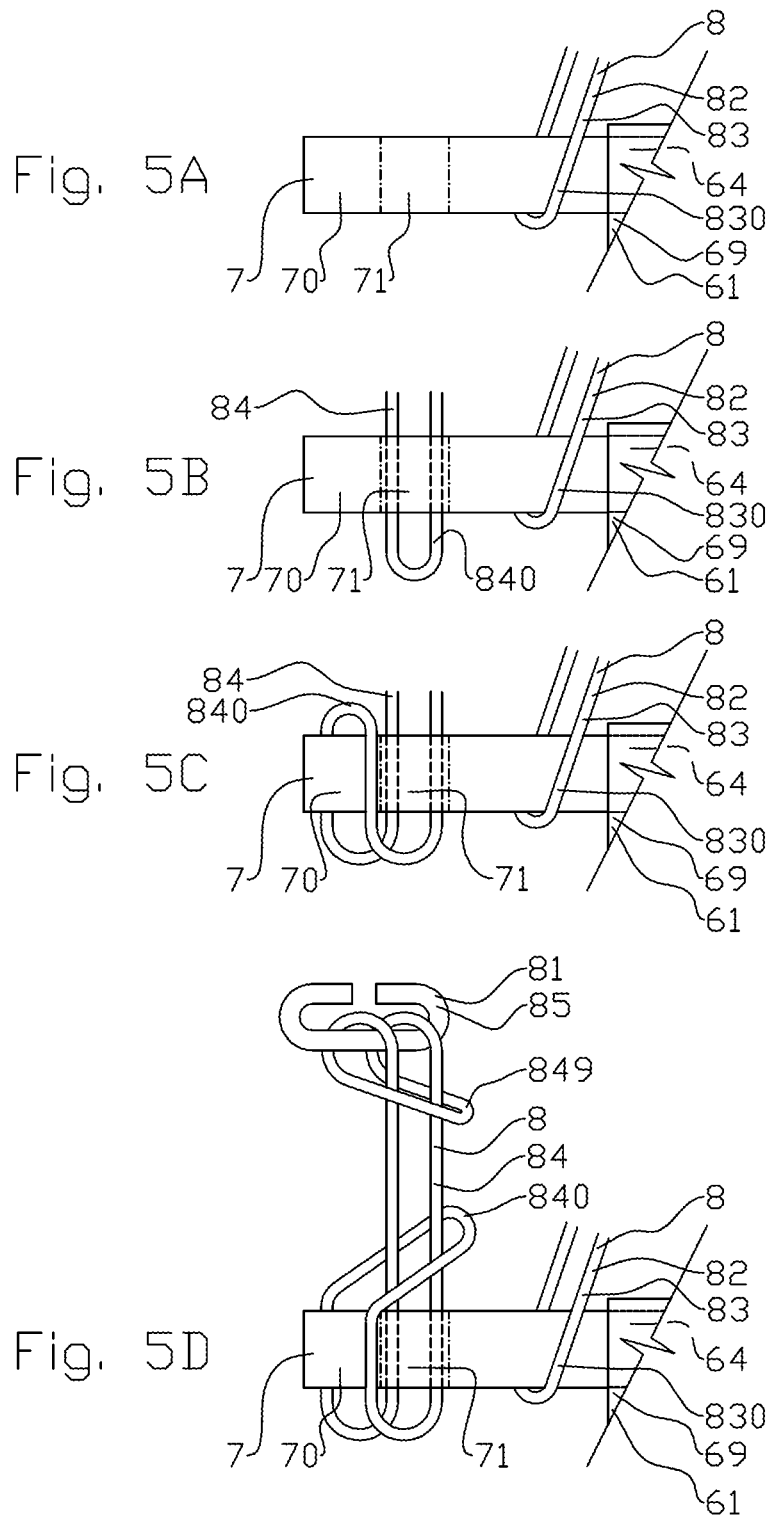
FIGS. 5A-5D show schematically, on a larger scale, attachment of a fastening strap to a yoke positioned on the closed enclosure.

In addition to the coupling arm 61 and the yoke 7, the coupling 6 includes a strap 8 and a coupling member 81. The strap 8 is shown as a round sling 82. In the first embodiment, see FIGS. 3 and 5A-D, a first strap 83 with a first portion 830 is positioned on the first end portion 70 of the yoke 7, between the first through opening 71 and the sleeve 64, see FIG. 5A. A second strap 84 has been threaded, in its first portion 840, through the first opening 71 (FIG. 5B) and the rest of the strap 84 has been threaded through the loop formed by the first portion 840, see FIGS. 5 B-D. The strap 84 is prevented from slipping off the end portion 70 of the yoke 7 by the strap 84 having been passed through the first through opening 71. The strap 83 is prevented from slipping off the first end portion 70 of the yoke 7 by the strap 83 resting, on one side, against the coupling arm 61 and, on the other side, against the strap 84. The other coupling member 81, shown in the figures as a C-hook 85, is secured to the second portion 849 of the strap 84 by the second portion 849 forming a loop as shown in FIG. 5D. The first strap 83 is provided, in a second end portion 839, with the coupling member 81, shown in the figures as a C-hook 85. The C-hook 85 is shown attached to the second end portion 839 with a loop, see FIG. 6.

Figure 6:
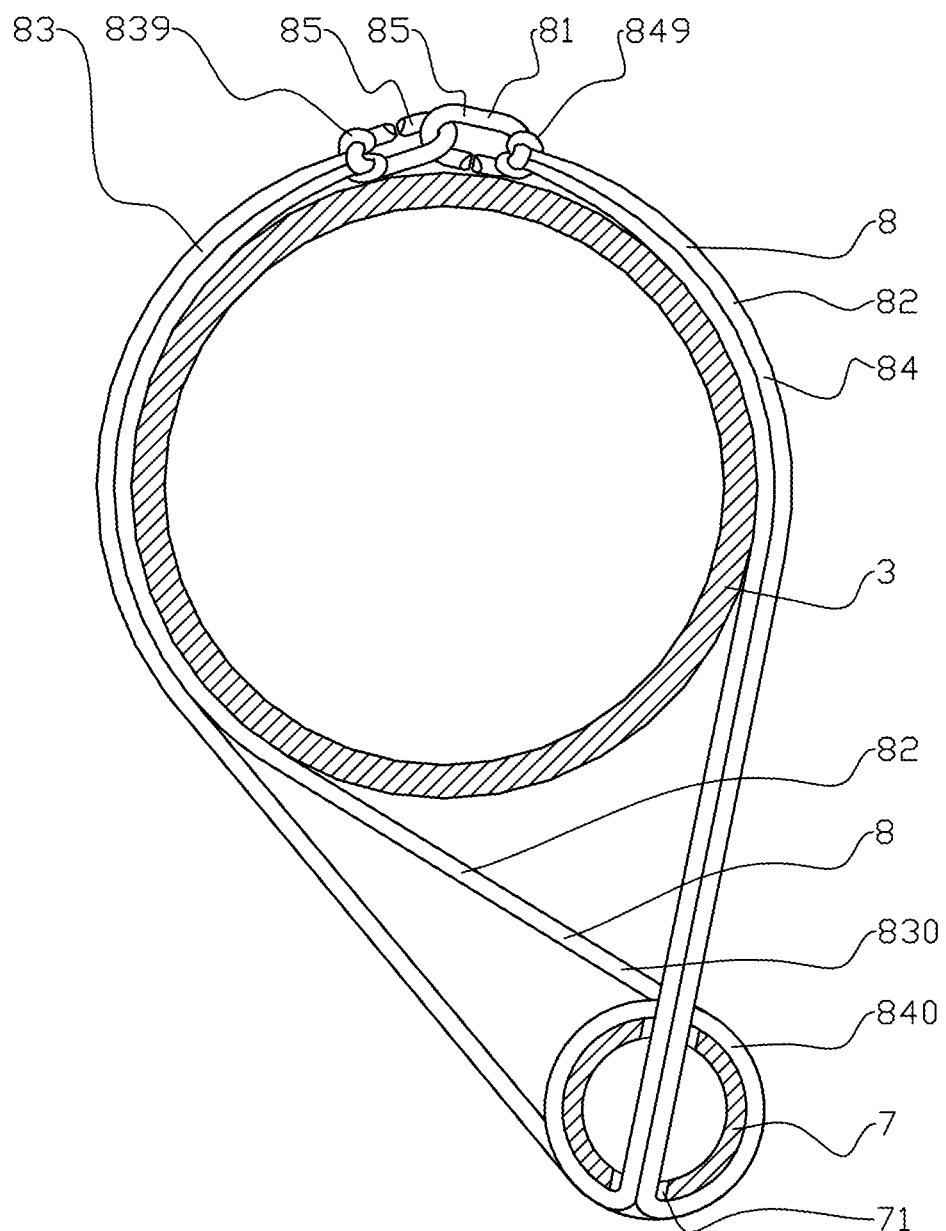
FIG. 6 shows a side view, on yet a larger scale, of the fastening strap secured to the yoke and to the buoyancy body.

The yoke 7 is secured to the inner buoyancy body 3 by the first strap 83 being passed to the top side of the buoyancy body 3 from one side of the buoyancy body 3, and the second strap 84 being passed to the top side of the buoyancy body 3 from the opposite side of the buoyancy body 3 as shown in FIG. 6. The coupling members 81 of the two straps 83, 84 are connected to each other at the top side of the buoyancy body 3. The coupling member 81 in the form of the C-hook 85 forms a coupling which can be put together and separated in a quick way and without tools when the straps 83, 84 are not strained. When the straps 83, 84 are strained, the C-hooks 85 will form a secure connection.

Figure 3:
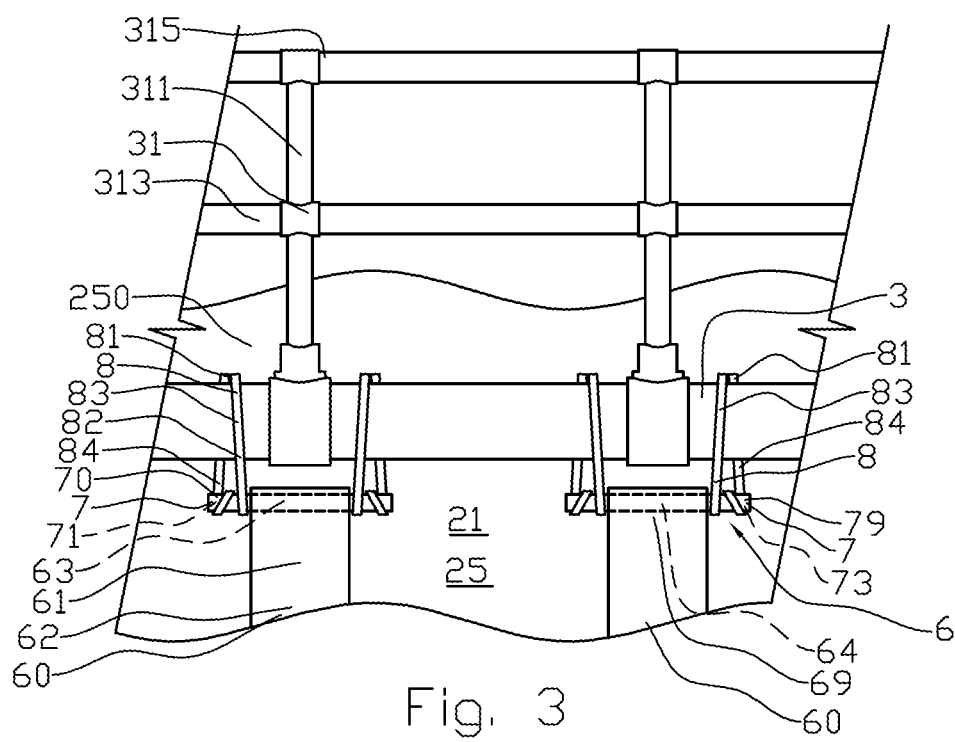
FIG. 3 shows a section, on a larger scale, of a perspective view of the fish pen viewed from the outside and a coupling between an enclosure in the closed fish pen and a buoyancy body.

In the foregoing, it has been described in detail how the straps 83, 84 are secured to the first end portion 70 of the yoke 7. As shown in FIG. 3, corresponding straps 83, 84 are secured to the second end portion 79 of the yoke 7. The strap 84 has been passed, in the portion 840, through the second through opening 73.

Figure 4:
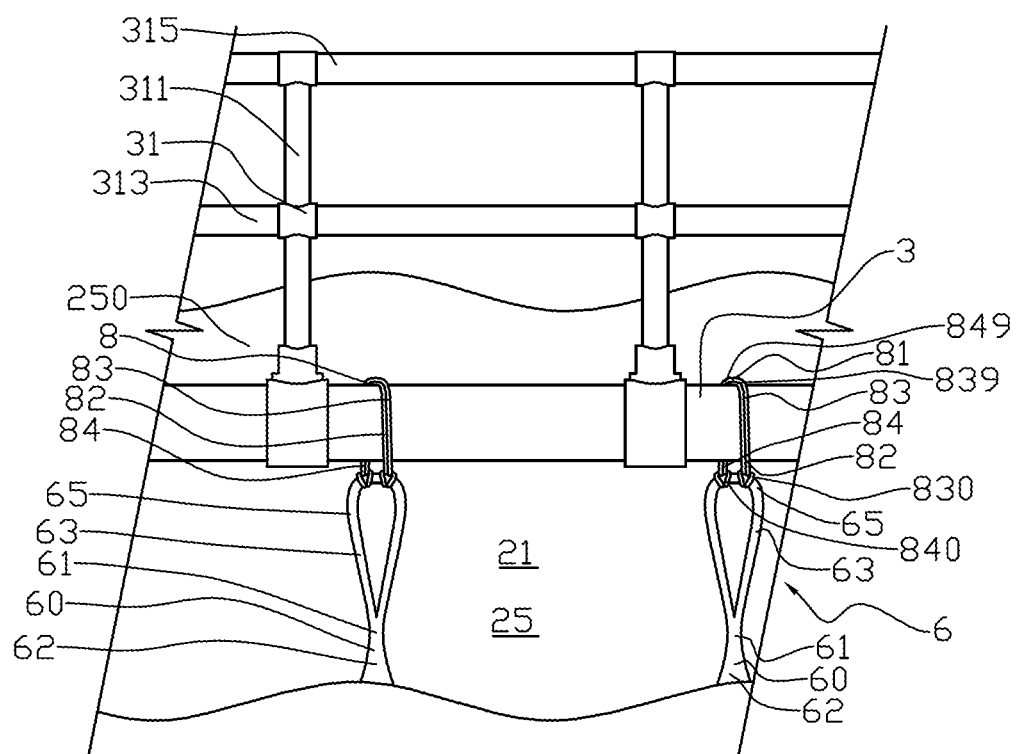
FIG. 4 shows the same as FIG. 3 in an alternative embodiment.

FIG. 4 shows an alternative embodiment. The first strap 83 is secured to the lift eye 65 with a loop in its first portion 830. In its second portion 839, the strap 83 is provided with the coupling member 81 in the same way as described in the first embodiment. The second strap 84 is secured to the lift eye 65 with a loop in its first portion 840. In its second portion 849, the strap 84 is provided with the coupling member 81 in the same way as described in the first embodiment. The straps 83, 84 are connected to each other at the top side of the inner buoyancy body 3 in the same way as described for the first exemplary embodiment.

Figure 7:
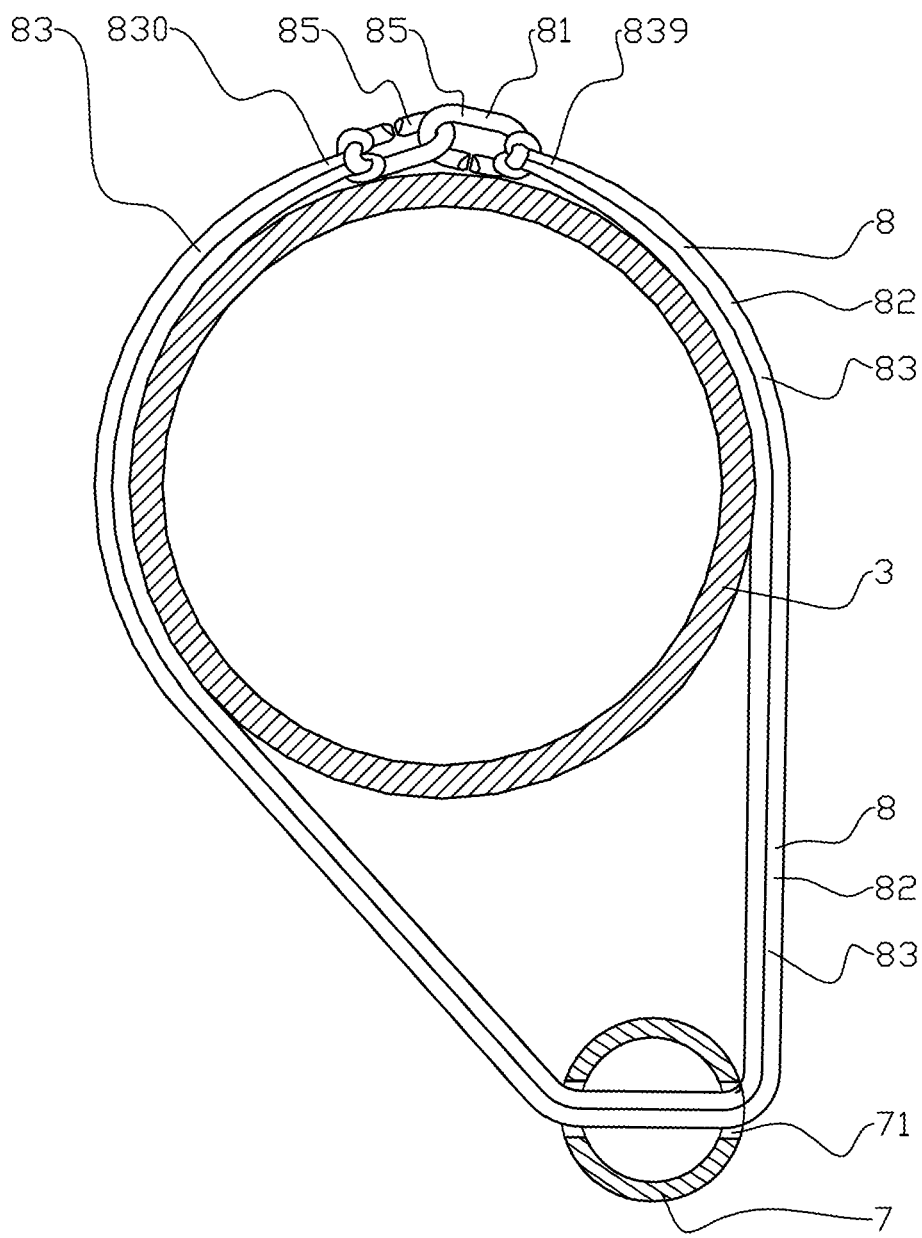
FIG. 7 shows the same as FIG. 6, but in an alternative embodiment.

FIG. 7 shows an alternative to the embodiment shown in FIG. 6. The strap 8, 83 is provided with a hook 85 in the first portion 830 and a hook 85 in the second portion 839. The strap 83 has been passed through the first through opening 71 of the yoke 7. The first portion 830 has been passed to the top side of the floating body 3 on the inside of the floating body 3, and the second portion 839 has been passed to the top side of the floating body 3 on the outside of the floating body 3. The hooks 85 are connected to each other at the top side of the floating body 3. In this alternative embodiment it is sufficient to have one strap 8 in each of the end portions 70, 79 of the yoke 7.

Figure 8:
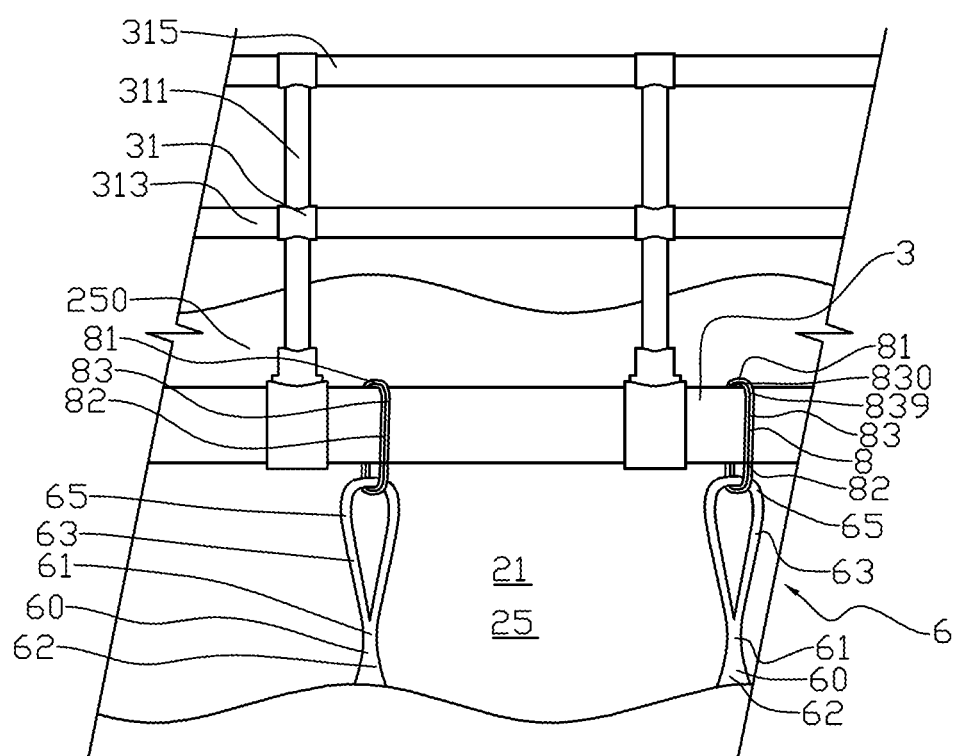
FIG. 8 shows the same as FIG. 4, but in an alternative embodiment.

FIG. 8 shows an alternative to the embodiment shown in FIG. 4. The strap 8, 83 is provided with a hook 85 in the first portion 830 and a hook 85 in the second portion 839 as is shown in FIG. 7 (not shown in FIG. 8). The strap 83 has been passed through the lift eye 65. The first portion 830 has been passed to the top side of the floating body 3 on the inside of the floating body 3, and the second portion 839 has been passed to the top side of the floating body 3 on the outside of the floating body 3. The hooks 85 are connected to each other at the top side of the floating body 3 as shown in FIG. 7 and form the coupling member 81. In this alternative embodiment it is sufficient to have one strap 8 in each of the lift eyes 65.

In the figures, the strap 8 is shown as a round sling 82. A round sling 82 is well suited as a strap 8, 83 as a C-hook 85 may be attached to the first portion 830 or to the second portion 839 without the use of a tool, while, at the same time, a strong connection is established between the hook 85 and the strap 8. The person skilled in the art will know that, in alternative embodiments, the strap 8 may consist of a rope, a chain or a wire. A C-hook 85 may also be attached to a rope, a chain and a wire. The person skilled in the art will know that the coupling member 81 may be formed in other ways than those described, for example as a knot and with shackles and eyelets. The person skilled in the art will also know that a rope, chain or wire may also be attached to the fastening eye 83 in other ways than those described.

It should be noted that all the above-mentioned embodiments illustrate the invention, but do not limit it, and persons skilled in the art may construct many alternative embodiments without departing from the scope of the attached claims. In the claims, reference numbers in parentheses are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A system for fish farming, the system comprising a fish pen having an enclosure, a buoyancy body configured to float on a water surface and configured to have sufficient buoyancy to keep the fish pen afloat, and a coupling that releasably secures the enclosure to the buoyancy body, wherein the enclosure comprises a wall with an outside and an inside, and the wall comprises an upper portion extending above the water surface, and wherein the coupling comprises a fastening eye coupled to the outside of the wall in a portion below the upper portion and a strap coupling the fastening eye to the buoyancy body and the buoyancy body is positioned on the outside of the wall.

2. The system according to claim 1, wherein the coupling further comprises a coupling arm having a lower end portion secured to the outside of the wall in a portion below the upper portion, and wherein the fastening eye is in a free end portion of the coupling arm.

3. The system according to claim 2, wherein the coupling arm comprises a polymer material cloth, wherein the wall comprises a polymer material cloth, and wherein the lower end portion of the coupling arm is coupled to the wall by a weld.

4. The system according to claim 1, wherein the fastening eye comprises
a sleeve extending substantially horizontally in a position of application, the sleeve having a first opening and a second opening; and
an elongated yoke having a first end portion and a second end portion, wherein the elongated yoke is positioned in the sleeve such that the first end portion projects out of the first opening and the second end portion projects out of the second opening; and
wherein the strap couples at least one of the first end portion and the second end portion to the buoyancy body.

5. The system according to claim 4, wherein the yoke comprises a through opening in at least one of the first end portion and the second end portion, and wherein the through opening houses the strap.

6. The system according to claim 4, wherein the enclosure comprises a seine and wherein the sleeve is a portion of the seine.

7. The system according to claim 1, wherein the strap is selected from a group consisting of a round sling, a rope, a wire and a chain.

8. The system according claim 1, wherein the strap is one of two straps, and wherein the fastening eye is releasably secured to the buoyancy body by the two straps.

9. The system according to claim 1, wherein the strap has a first portion and a second portion, and further comprising a hook on at least one of the first portion and the second portion.

10. The system according to claim 9, wherein the hook is one of first and second hooks on the first and second portions of the strap, respectively, and wherein the strap is housed in the fastening eye so that the first portion extends past an inside of the buoyancy body to a top side of the buoyancy body, so that the second portion extends past an outside of the buoyancy body to the top side of the buoyancy body, and so that the first and second hooks are coupled together at the top side of the buoyancy body.

11. The system according to claim 9, wherein the fastening eye comprises a sleeve that extends substantially horizontally in a position of application, the sleeve having a first opening and a second opening, wherein an elongated yoke with a first end portion and a second end portion is positioned in the sleeve such that the first end portion projects beyond the first opening and the second end portion projects beyond the second opening, and wherein the strap is a first strap that couples the first end portion to the buoyancy body, and further comprising a second strap that couples the second end portion to the buoyancy body.

12. The system according to claim 11, wherein the yoke comprises a through opening in at least one of the first end portion and the second end portion, and wherein the through opening houses a respective one of the first and second straps.

13. The system according to claim 12, wherein the hook is one of first and second hooks provided on the first and second portions of the strap, respectively, wherein the strap is housed in the through opening so that the first portion of the strap extends past an inside of the buoyancy body to the top side of the buoyancy body, so that the second portion of the strap extends past an outside of the buoyancy body to the top side of the buoyancy body, and wherein the first portion of the strap and the second portion of the strap are coupled to each other by the first and second hooks at the top side of the buoyancy body.

14. The system according to claim 12, wherein the strap is one of first and second straps, wherein the first and second straps are secured to the first and second end portions of the yoke, respectively, wherein the hook is one of first and second hooks on the first and second straps, respectively, wherein the first strap extends past an inside of the buoyancy body to a top side of the buoyancy body, and wherein the second strap extends past an outside of the buoyancy body to the top side of the buoyancy body, and wherein the first and second hooks are coupled together at the top side of the buoyancy body.

15. The system according to claim 9, wherein the strap is selected from a group consisting of a round sling, a rope, a wire and a chain.

16. The system according to claim 9, wherein the hook comprises a C-hook.

17. A method of securing an enclosure in a fish pen to a buoyancy body configured to float on a water surface and configured to have sufficient buoyancy to keep the fish pen afloat via a coupling, wherein the enclosure comprises a wall with an outside and an inside, and the wall comprises an upper portion extending above the water surface, and wherein the coupling comprises a fastening eye coupled to the outside of the wall in a portion below the upper portion and a strap coupling the fastening eye to the buoyancy body and the buoyancy body is positioned on the outside of the wall, wherein the strap has a first portion and a second portion, and further wherein a hook is provided on at least one of the first portion and the second portion, the method comprising using a round sling for securing the enclosure, the round sling comprising the strap and the hook.

18. A system for fish farming, the system comprising:
a fish pen having an enclosure that includes a wall having an outside, an inside, and an upper portion that extends above a water surface;
a buoyancy body positioned along the outside of the wall and configured to float on a water surface and have sufficient buoyancy to keep the fish pen afloat;
a coupling that releasably secures the enclosure to the buoyancy body, the coupling having:
a fastening eye coupled to the outside of the wall below the upper portion; and
a strap coupling the fastening eye to the buoyancy body.

* * * * *